US007374484B2

(12) United States Patent
Bennett, III

(10) Patent No.: US 7,374,484 B2
(45) Date of Patent: May 20, 2008

(54) LOTTERY TICKET SECURITY METHOD

(75) Inventor: Joseph W. Bennett, III, Sugar Hill, GA (US)

(73) Assignee: Scientific Games Inc., Alpharetta, GA (US)

( * ) Notice: Subject to any disclaimer, the term of this patent is extended or adjusted under 35 U.S.C. 154(b) by 1092 days.

(21) Appl. No.: 10/629,686

(22) Filed: Jul. 30, 2003

(65) Prior Publication Data

US 2004/0056416 A1 Mar. 25, 2004

(51) Int. Cl.
*A63F 9/24* (2006.01)
*A63F 13/00* (2006.01)
*A63F 3/06* (2006.01)
*G06F 17/00* (2006.01)
*G06F 19/00* (2006.01)
*B42D 15/00* (2006.01)

(52) U.S. Cl. .......................... 463/17; 463/16; 273/269; 283/73; 283/74

(58) Field of Classification Search ............ 463/16–29, 463/40–43; 273/139, 138.2, 269, 148 R; 283/17, 49, 51, 73, 74, 79
See application file for complete search history.

(56) References Cited

U.S. PATENT DOCUMENTS 4,191,376 A 3/1980 Goldman et al. ........... 273/139
4,398,708 A * 8/1983 Goldman et al. ............. 270/18
4,463,250 A * 7/1984 McNeight et al. .......... 235/385
4,858,123 A 8/1989 Alexoff et al. ............. 264/412
4,871,172 A * 10/1989 Hwang .................... 273/138.1
5,935,000 A * 8/1999 Sanchez et al. ............... 463/17
5,949,042 A * 9/1999 Dietz et al. ................. 235/375
6,752,319 B2 * 6/2004 Ehrhart et al. .............. 235/486

* cited by examiner

*Primary Examiner*—Robert E. Pezzuto
*Assistant Examiner*—Binh-An D. Nguyen
(74) *Attorney, Agent, or Firm*—Dority & Manning, P.A.

(57) ABSTRACT

In a method for manufacturing instant lottery tickets where book numbers and ticket numbers are printed on the tickets utilizing a dual security process such that the book numbers are shuffled in each pool before the tickets are printed to break the link between the book numbers the ticket numbers or validation numbers, a reversing process can be used under certain predefined conditions to relate the original book numbers to the ticket numbers or validation numbers. In one example, where a shuffling algorithm utilizing seeds is used to shuffle the book numbers, the seeds used in the algorithm are maintained in an encrypted file. A decryption key for the encrypted seed file can be used by a lottery administration or trusted third party to reconstruct game play indicia for game adjustment purposes and manufacturing adjustments. To enhance security, the independent third party can also be used to administer the encryption and decryption keys during the ticket manufacturing process and during life of the instant ticket game.

22 Claims, 4 Drawing Sheets

LOTTERY TICKET SECURITY METHOD

FIELD OF THE INVENTION

The invention relates to lottery ticket manufacturing methods and in particular to secure methods for manufacturing lottery tickets particularly instant tickets having play indicia indicating whether or not the ticket is a prize winner imaged on the tickets.

BACKGROUND OF THE INVENTION

In most instant lottery ticket games, a set of tickets is imaged with play or prize value indicia under a scratch-off coating according to a predetermined prize structure. Typically, the prize structure consists of one or more large value prizes, a number of lesser value prizes and a large number of tickets that are not prize winners. The prize values in a game are distributed randomly on the tickets so that, in theory, each player has an equal chance to win one of the prizes. In the United States, lottery ticket manufacturers or vendors typically produce lottery games that are divided up into pools where each pool has a prize structure. Each pool is then divided into a number of packs where each pack contains a preset number of lottery tickets. For example, a game might have several million tickets where each pool contains 240,000 tickets and each pool contains 800 books of 300 tickets. However, games can be organized in different ways and can, for example, consist of a set of packs not grouped into pools. Usually each individual pack of tickets, also termed books, is packaged by the vendor for delivery to the lottery administration or lottery sales agents.

The term "image" is a term that is commonly used by lottery ticket manufactures or ticket vendors to indicate a system whereby variable indicia including ticket symbols such as play indicia and validation numbers are transferred onto the instant ticket as opposed to, for example, display printing which is the typical method of applying a common graphic to all the tickets in a game. Although these symbols are not technically printed on the ticket, it is common to use the terms imaged and printed interchangeably. The invention as described below is independent of whether symbols are imaged or printed.

As part of the manufacturing process, the vendor images ticket identification data which can include the game number, pack number and ticket number on each lottery ticket along with other information that includes a validation number and a bar code. The barcode typically represents both the inventory information and validation number and is generally imaged on the ticket back. The data on each ticket, including the ticket identification data, the play indicia, the barcode, is typically generated by computer programs and inkjet imaged on each ticket. All of this data including the game play data, the ticket identification data and the validation number is imaged on the ticket and is subsequently covered by a scratch-off coating. The lottery tickets are then sent to a state lottery administration for sale. For these types of lottery tickets, one function of the validation number is to reduce fraudulent redemptions where the ticket has been altered. The validation number is usually an encrypted number that serves to uniquely identify the lottery ticket and therefore the play data on that particular ticket so that the lottery administration can determine if, in fact, the ticket is a winner when it is redeemed by a player.

This method has been termed a 'single pass security' process where there is a defined relationship between the ticket identification data and the validation number imaged on each lottery ticket. This relationship may algorithmic. Or this relationship may be a file or a set of files that relate the ticket identification data to the validation number. In 'single pass security', there is a definite method to determine the ticket's value based on either (1) the ticket identification data or (2) the validation number. For example, one could use the ticket identification data as an input to a computer program or algorithm to determine the ticket's value. One could also use the ticket's validation number as input to determine the ticket's value.

In order to improve security, a manufacturing technique termed 'dual security' was developed to eliminate the relationship between the ticket identification data and the validation number. In this method, the ticket identification data imaged on the ticket, specifically the pack number, cannot be used to determine the ticket's value; however, the validation number could still be used to determine the ticket's value. Lottery tickets printed using this technique have a pack number imaged on the tickets that is different than the pack number originally assigned by the game generation program used in the lottery ticket programming process. This security process was designed to irreversibly break the relationship between the pack number and the validation number imaged on the ticket. Thus, knowledge of the game generation program or its results can not be used illicitly by someone having access to this information to select winning lottery tickets before they are sold.

One approach to dual security is to employ a shuffling routine, using a shuffle key, for example, as an input variable, to independently shuffle the pack numbers in a pool after they are computer generated by the lottery ticket programming process. The result is a set of pack numbers imaged on the tickets that are unknown to those having access to the game generation program. In this approach, the shuffle keys are not recorded or maintained by the vendor's programming staff and as a result, the dual security is essentially irreversible. Furthermore, the possibility of anyone on either the vendor's or the lottery administration's staff of being able to illicitly identify winning lottery tickets by using the pack and ticket number imaged on the tickets is substantially reduced.

However, dual security has significant disadvantages in that the process does not permit the vendor to provide reports or services that rely on the pack number as the key to the value of the pack. For example, it does not allow the vendor to reconstruct listings of tickets from the imaged pack number in order to adjust for manufacturing variances. Nor does it allow the vendor to provide reports of the aggregate value of the shipment of tickets to the Lottery. In both cases, neither the vendor and specifically the vendor's programming system nor the lottery administration has a method to determine the value of a set of tickets based on the imaged pack number.

SUMMARY OF THE INVENTION

It is therefore an object of the invention to provide a method of manufacturing lottery tickets that provides the security of a dual security type process where ticket identification information imaged on the ticket is severed from ticket value information while at the same time also providing the capability to reconstruct, under certain limited circumstances, ticket information from the identification information imaged on the ticket.

It is also an object of the invention to provide a method of manufacturing lottery tickets that provides the security of the dual security process while at the same time also provides the capability for the vendor and the lottery administration to reconstruct ticket information from the imaged pack number on the ticket under certain limited circumstances.

A further object of the invention to provide a method of manufacturing instant lottery tickets where ticket identification data such as pack numbers imaged on the tickets are shuffled as in a dual security method, but where the mechanism for shuffling this information can be reversed under certain specified circumstances.

An additional object of the invention is to provide a dual security type method for manufacturing lottery tickets where pack numbers are shuffled in each pool or in each game before the tickets are printed according to a shuffling algorithm and where the shuffle seeds used in the shuffle algorithm are maintained in an encrypted file or files. A decryption key for the encrypted shuffle seed file can be used by the vendor or the lottery administration or an independent trusted third party to unshuffle the dual security pack numbers and thus transform the imaged pack numbers into the game generation pack numbers known by the game programming computer system. This allows for the reconstruction of game play indicia for game adjustment purposes and manufacturing adjustments by pack number. To enhance security, an independent third party can be used to administer the management of the encryption/decryption keys during the manufacturing process for the vendor. During life of the instant ticket game, the third party may also provide additional security services to the state lottery administration related to the invention.

Still another object of the invention is to provide the necessary computer hardware and algorithms to the state lottery administration that will allow the lottery to obtain from the vendor a reconstruction of the game play data via the imaged pack number. For example, the lottery administration can input the shuffled pack number imaged on the ticket to a computer algorithm, which in turn, decrypts the shuffled pack number such that the vendor can reconstruct the unshuffled pack number. In this manner, the vendor is then capable of providing to the lottery a reconstruction of the game data based on the imaged pack number as administered, for example, by a lottery administration security department.

A further object of the invention is to define two independent numeric domains used to identify pack numbers. One domain, the P1 domain, is the set of unshuffled pack numbers generated and known by the computer programs used in the generation of game data. The second domain, P2, is the set of shuffled pack numbers imaged on the tickets during the manufacturing process.

Yet another object of the invention is to define and provide for the manufacture of lottery tickets a system of computer hardware and software that is capable of securely defining the relationship between the two independent numeric domains, P1 and P2, such that this relationship remains an unknowable secret and that any attempt to breach this relationship is detectable.

A further object of the invention is to define and provide for the manufacture of lottery tickets a system of computer hardware and software that is capable of securely translating packs from the P1 domain into packs from the P2 domain and vice versa. Game programming personnel can perform their work on the internal P1 domain, and a secure computer transforms any outgoing data into the external P2 domain such that game programming personnel are (1) unaware of the relationship between the two domains and (2) unaware that the pack is transformed into the P2 domain.

It is also an object of the invention is to define and provide for the manufacture of lottery tickets a system of internal audit procedures that documents and monitors the translation between the P1 and P2 domains such that any unauthorized translation is detectable before a lottery game is set for sale.

Another object of the invention is to define and provide for the manufacture of lottery tickets a system of external audit procedures performed by a "Trusted Third Party" that further documents and monitors the translation between the P1 and P2 domains such that any unauthorized translation is detectable before a lottery game is set for sale.

Another object of the invention is to define and provide for the manufacture of lottery tickets a system of procedures performed by a "Trusted Third Party" during the full life-cycle of an instant ticket game such that their services enhance the security of the instant game.

DETAILED DESCRIPTION OF THE INVENTION

Figure 1:
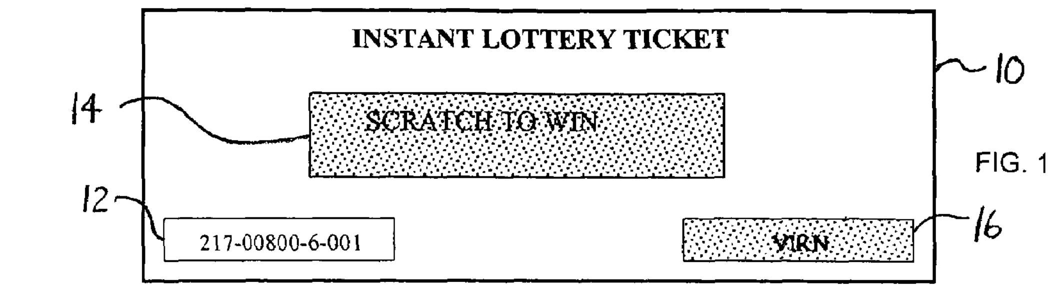
FIG. 1 is a front plan view of an instant lottery ticket.

FIG. 1 is a simplified representation of a conventional instant lottery ticket 10 that includes an imaged identification 12 of the ticket 10 and a scratch-off material 14 covering a set of play indicia (not shown). Also, imaged on the lottery ticket 10 is a validation number, indicated at 16 by the term VIRN, which can be imaged on the lottery ticket 10 in either or both alphanumeric or bar code form and in some cases covered by a scratch-off coating. The validation number 16 can be imaged as a barcode on the back of the lottery ticket 10 as well. In conventional instant lottery games, the tickets 10 are imaged with play indicia under the scratch-off coating 14 that indicate the prize value of the lottery ticket 10. It should be understood that there are a wide variety of lottery tickets including probability tickets and instant lottery tickets with variable prizes along with tickets of various types of construction and that the lottery ticket 10 of FIG. 1 is only shown to provide a context for a method of secure manufacture according to the invention.

Figure 2:
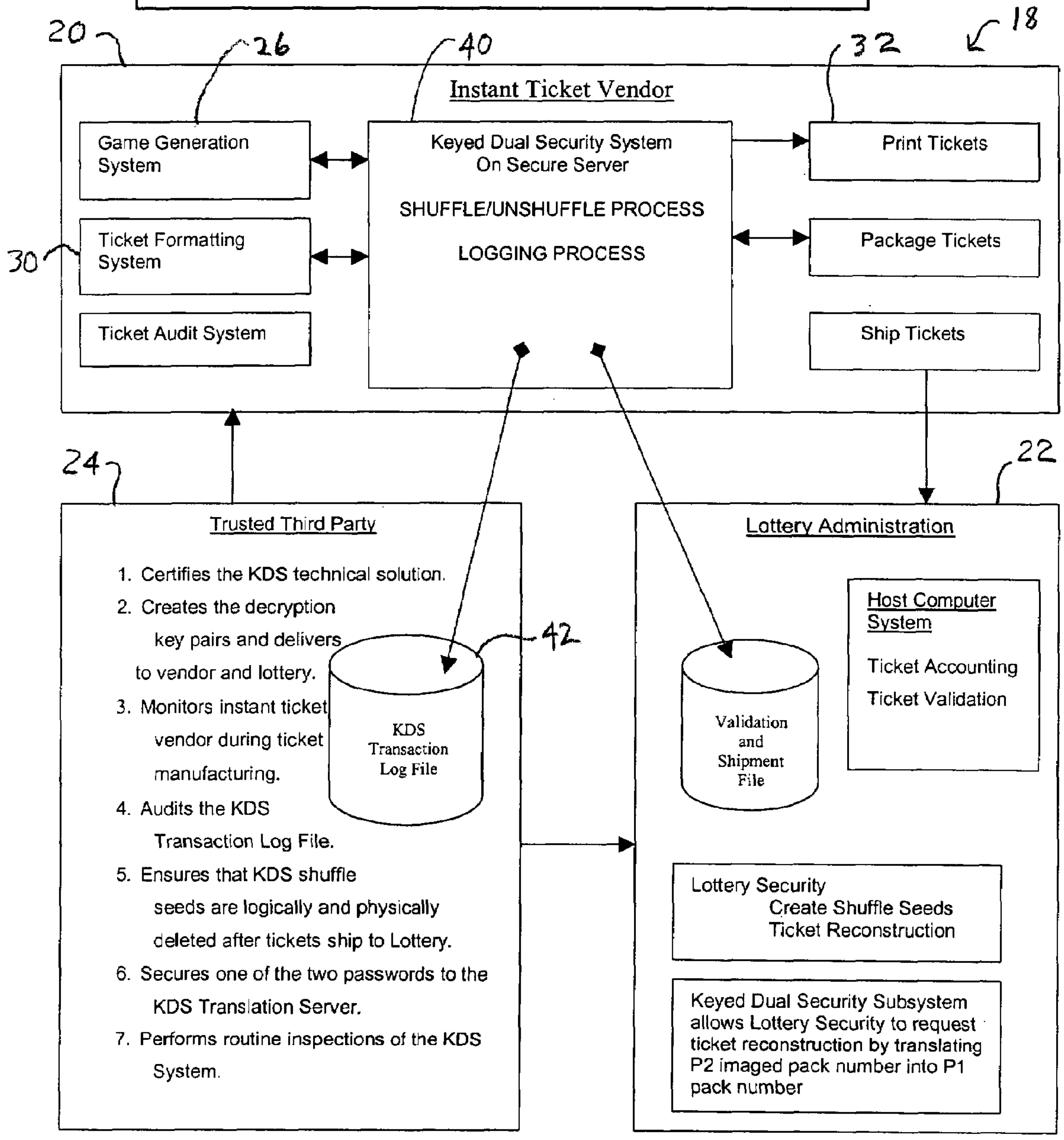
FIG. 2 is a block diagram of a the relationship between an instant ticket vendor, a lottery administration and a Trusted Third Party according to the invention.
Figure 3:
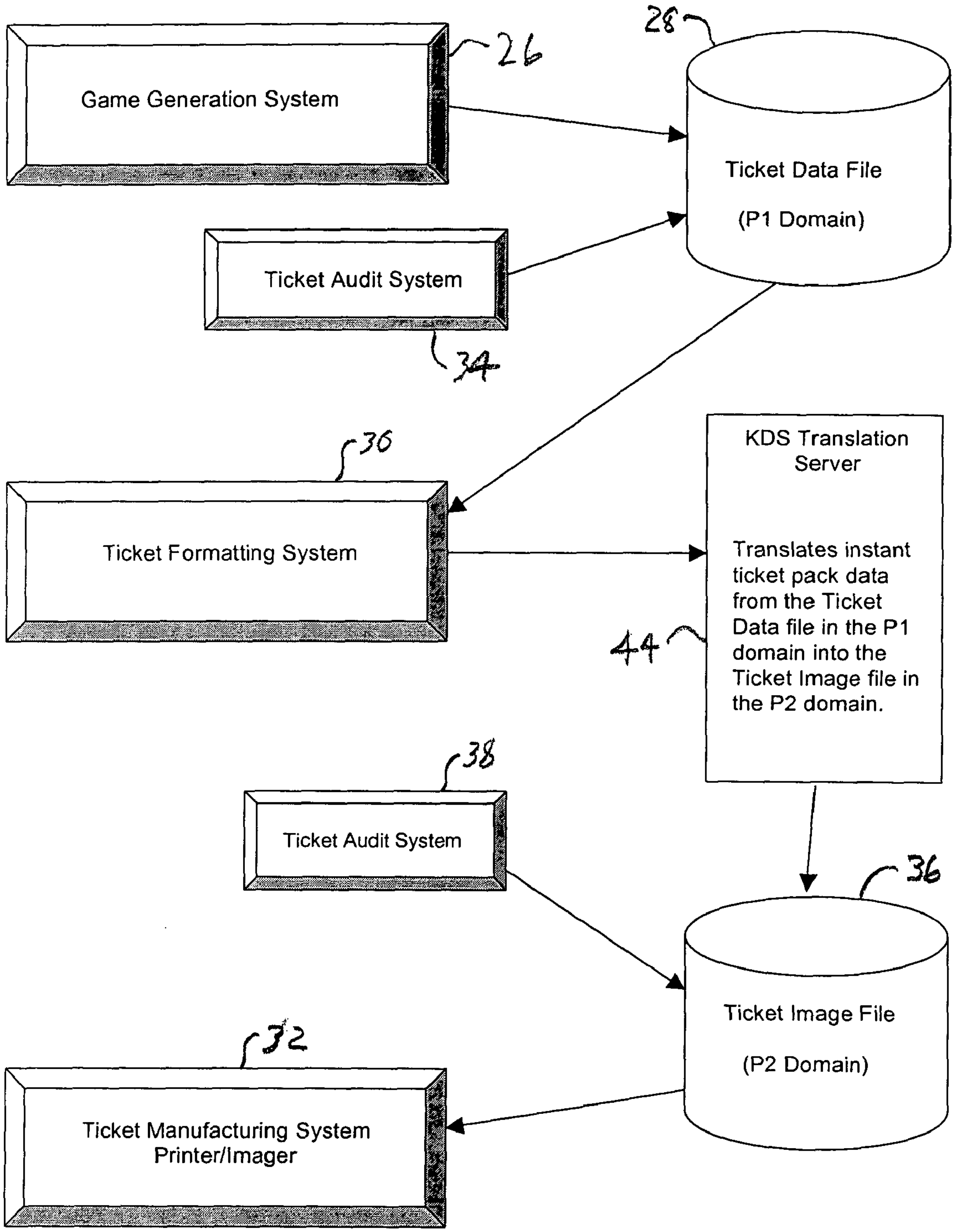
FIG. 3 is a block diagram of a lottery ticket manufacturing system according to the invention.

With reference to FIGS. 2 and 3, operation of the preferred embodiment of the invention for the secure method of manufacturing lottery tickets such as the instant lottery ticket 10 will be described. It should be understood however that the invention can equally apply to methods of manufacturing lottery tickets other than that described in connection with FIG. 2 where, for example, a game structure does not include a pool, pack, ticket number combination or where data is applied to a lottery ticket by methods other than imaging or printing. Here, FIG. 2 is a block diagram 18 depicting a method of manufacturing lottery tickets such as the ticket 10 for a typical state-administered lottery system according to the invention. Included in the block diagram 18 are a block 20 representing a vendor or ticket manufacturer, a block 22 representing a lottery administration and a block 24 representing an independent third party. It is typical practice in the United States lottery industry for a ticket vendor such as the vendor 20 to provide the lottery administration 22 with one or more sets of tickets 10 where each set is defined as a game. Each game will normally have a structure with a predetermined number of winning tickets and a predetermined number of losing tickets. In some cases, games are divided into pools where each pool has its own prize structure, that is, a predetermined number of winning tickets having predetermined redemption values. Each pool is then divided into a number of packs, also termed books, which in turn contain a predetermined number of tickets. For example, a game might have 12 million of the tickets 10 divided up into 50 pools where each pool contains 800 packs of 300 the tickets 10. Note, however, it is not integral to the invention that the game be subdivided into pools. An instant ticket game could simply be a subdivision of packs, without being further subdivided into pools.

The first step in the process of manufacturing a game, after the game has been designed, is for the vendor 20 to run a game generation program indicated by a block 26. The output of the generation program 26 is a ticket data file 28 that contains a record for each ticket where the records are organized by pool, pack number and ticket number. An example of a portion of such a file is provided below:

| G | P | T | VIRN | BARCODE | PLAY DATA |
|---|---|---|---|---|---|
| 217 | 00800 | 000 | 372250687988 | 2170080000037225068798 | 5XX2L1TDL |
| 217 | 00800 | 001 | 367229412701 | 2170080000136722941219 | XTL2DDT5Z |
| 217 | 00800 | 010 | 266754724227 | 2170080001026675472422 | D2T2DT5LX |

Where G=Game number, P=pack number; T=Ticket Number, VIRN=validation number, BARCODE=barcode; and PLAY DATA=the "game data" that defines the play value of the lottery ticket. In this illustration of the invention, a pool is a logical subdivision of a game, and it is not integral to the invention. A game can also simply be composed of a single set of packs. The ticket data file 28 is then formatted as indicated at 30 per the specifications of an inkjet imaging system 32 such as, a Scitex 3600 imaging system operated by the vendor 20. It is also audited as indicated at 34, and a resulting ticket image file 36 is then audited, as indicated at 38, and used by the vendor 20 to image the information onto the lottery tickets 10 at 32. The information imaged on the tickets 10 includes the ticket identification data 12, the VIRN number 16 along with the play indicia. The VIRN number 16 and play indicia are typically covered by the scratch-off coating 14. Also, the BARCODE data can be used to print a bar code that contains the ticket identification data on the back of the ticket 10.

In the single-pass security method as described above, the lottery tickets 10 are imaged with the exact same information that is contained in the ticket data file 28 including the pack number, ticket number and validation data. Therefore in single-pass security, the pack numbers in the ticket data file 28 represent the same ticket data, that is the play indicia, the validation number, and the barcode, as the pack numbers in the ticket image file 36. In practice this results in the fact that the imaged pack numbers on the physical ticket packs set for delivery to the lottery 22 are the exact pack numbers found in the ticket data file 28. This relationship would allow one with access to the ticket data file 28 to know all variable game data, including winner information, found within a delivered, unscratched book of tickets by searching for corresponding pack number within the ticket data file 28. For example, if the lottery tickets 10 in a pack x had value y in the ticket data file 28, then by using the single-pass security method, the lottery tickets 10 in the pack x would have the same value y in the distributed tickets.

In the dual security method, however, a shuffle algorithm as represented in a block 40 is used by the vendor 20 as indicated by a block 36 to shuffle the pack numbers such that the pack numbers in the ticket data file are irreversibly shuffled at 40 before they are written to the ticket image file 36. By doing this shuffle, any existing link between the ticket identification 12 and the VIRN numbers 16 imaged on the tickets 10 is broken. Any attempt to use the ticket data file 28 to determine the value of the lottery tickets in any one of the delivered packs would be essentially fruitless. For example, if the tickets 10 in the pack x had the value y in the ticket data file 28, then by definition of dual-security, the pack x would be very unlikely to have the value y in the distributed tickets 10. In the case of a pool with 800 packs, the odds of the distributed pack x having the value y would be approximately 800 to 1.

One of the top level risks addressed by the dual security method is collusion between game programming and game distribution. Specifically, one with illicit access to a game generation file generated at 26 could pass information to one with illicit access to a pack distribution file. The former typically has information regarding the value of a pack; and the latter has information regarding the location of the pack.

As discussed above, the primary mechanism of addressing the risk of collusion is to irreversibly shuffle the pack identifier such that a pack number in the game generation file or in the ticket data file 28 is not guaranteed to equal a pack number in the distributed tickets 10. Therefore, even the illicit passing of the pack information from a game generation organization such as the vendor 20 to a game distribution organization such as the lottery administration 22 does not provide the location of winning packs that have been distributed by either of the organizations.

Conventional dual security methods implement a one-way shuffle between the pack identifiers and the effectiveness of dual security is based on the principle that once a pack has been generated, shuffled and imaged, it can never be unshuffled.

In practice, a shuffle algorithm is used to shuffle the pack identifiers after the game data is generated and before the tickets are imaged. It is typical for shuffle algorithms to accept as input a seed, which in turn, mathematically governs the shuffle algorithm and thus results in a shuffle that is unpredictable. Typically, the seed is discarded after use which makes it virtually impossible to reverse the shuffle. As a result, no one, including the programming staff of the vendor 20 nor the lottery administration 22 can use the ticket data file 28 generated by the generation program 26 to determine which of the printed lottery tickets 10 are winners.

Again, not being able to reverse the shuffle has several significant disadvantages. Because the vendor's programming department has no ability to assess the value of the pack by using the pack number in the ticket data file 28, the vendor 20 can not provide reports detailing the exact value of a particular shipment of the tickets 10. The same limitation prevents the vendor 20 from adjusting the prize fund due to manufacturing production variances. Finally, the lottery administration 22 cannot request a reconstruction based on the pack number imaged on the pack of tickets.

In the method of the invention, however, a process is provided for establishing a secure, reversible link between the game generation ticket data file 28 and the ticket image file 36. More generally, the invention involves the provision of a link in a dual security environment that permits ticket value information to be reestablished with ticket identification information 12 imaged on the lottery ticket 10. For convenience of description, the method of the invention in the context of the system described above will be referred to as a keyed dual security method or KDS. This description of the KDS will include examples of a number of the computer programs and procedures necessary to address the issue of collusion that exists when tickets are produced using the single pass method and also, under certain controlled circumstances, overcome the inflexibility found in dual security method.

In this description of the preferred embodiment of the invention, KDS defines two disjoint sets of pack identifiers: one set in the game generation domain, which is called the P1 domain; and one set used in the distribution domain, which is called the P2 domain. The definition of these disjoint domains is the primary mechanism of addressing the risk of collusion: a pack number in the P1 domain is not guaranteed to equal a pack number in the P2 domain. For example, if the pack x had a value y in the ticket data file, then by the definitions used in this description of the invention, the pack x would not be guaranteed to have the value y in the distributed tickets. Therefore, because the packs are shuffled into the P2 domain after game generation, the illicit passing of pack information from game generation to game distribution does not guarantee that winning packs can be located. Furthermore, in this embodiment of the invention, the ticket manufacturer 20, under a set of controlled circumstances, can unshuffle the packs from the P2 domain back into the P1 domain to allow for the creation of files and reports that depend on information from the P2 domain.

Another feature of the preferred embodiment of the invention involves the use of an independent oversight role performed by the Trusted Third Party 24. The Trusted Third Party 24 can, in practice, be an independent firm or the security department of the lottery administration 22 or the security department of the vendor 20. During the production of each instant ticket game, the Trusted Third Party 24 will preferably oversee the ticket manufacturing process 32 as it relates to the invention and reports its findings to the lottery administration 22. A number of these oversight functions are shown in FIG. 2 at 24 and can include such functions as the inspection of any KDS log files 42 and audits of the various computer systems as they relate to the invention to ensure that no physical access has occurred.

The preferred embodiment of the invention would also utilize a KDS Certification process. Preferably, the Trusted Third Party 24 would certify that the system architecture and software is developed in accordance with the objectives of the invention. The results of the certification process will preferably be in the public domain as a KDS Certification letter and will be available to the lottery administration 22.

Moreover, one of the preferred roles of the Trusted Third Party as shown in block 24 can include the additional duties of creating a set of public/private key pairs used to encrypt and decrypt the KDS shuffle seeds. The Trusted Third Party 24 can preferably distribute the key pairs to the vendor 20 and the lottery administration 22. Additionally, the Trusted Third Party 24 would maintain a copy of the key pairs. In the preferred embodiment, the Trusted Third Party 24 would also ensure that the KDS Shuffle seeds had been physically and logically deleted from a KDS Translation server 44.

Therefore in general, in the preferred embodiment, the Trusted Third Party 24 would ensure that the rules established and agreed upon by the lottery administration 22 and the vendor 20 regarding the KDS method of ticket manufacturing are conformed to by both parties.

Additionally included in the preferred embodiment of the invention is a secure system that is designed with the capability of transforming packs from the P1 domain into the P2 domain and vice versa. For convenience of description, the computer systems indicated at 44 that securely shuffle and unshuffle pack identification data is termed the KDS Translation Server. In this embodiment, all pack information delivered from a game programming department 26 in the vendor 20 is shuffled into the P2 domain by the KDS Translation Server 44; and all pack information delivered to the game programming department 26 is unshuffled into the P1 domain by the KDS Translation Server 44 as depicted in FIG. 3. In this arrangement, the KDS Translation Server 44 serves as a gateway for all data traffic between the game programming department 26 and the manufacturing department 32. In this manner, all of the programs used by the game programming department 26 process only pack numbers from the P1 domain and have no knowledge of the P2 pack domain. Similarly, all printed tickets, shipment reports, validation files, and shipment files do not contain any knowledge of the P1 domain. Preferably, the translation between the domains is handled solely by the KDS Translation Server 44 such that the only intersection of the domains is controlled by the architecture and procedures that define the KDS Translation Server.

The systems that support the P1-P2 linkage form the basis for the security of the invention, which is founded on the principle that the linkage between the P1 and the P2 domains should remain a protected secret. In order for this secrecy to be maintained, it is critical that all functional elements that require knowledge of the P1-P2 linkage are executed within a secure environment that cannot be breached in a manner that is undetectable.

Generally, it is preferred that any processing that requires knowledge of the P1-P2 mapping will be performed within a system that is designed to protect this linkage. This includes a system that is physically isolated in a secure location. For example, it is preferable that the KDS Translation Server 44 be in a physically sealed environment, where one or more physical keys are required to gain access. To further increase security, it is also desirable that all such accesses to the physical keys be logged and require explicit authorization from specifically appointed personnel.

In another feature of the invention, the KDS Translation Server 44 is also logically isolated by its operating system's access control features. In one example, only two individuals would have system access to the KDS Translation Server 44: a system administrator from the instant ticket vendor 20 and an appointed analyst from the Trusted Third Party 24. This form of access to the machine 44 can be reserved for system administration and system audit. To further increase security, any other detected access to the KDS machine 44 results in the machine shutting down and all sensitive data destroyed. Startup of the machine 44 following any physical access could be considered a disaster recovery situation and require involvement by multiple individuals from both the vendor 20 and the Trusted Third Party 24.

It is also considered preferable that the KDS Translation Server 44 be further logically isolated by a firewall's access control system. This ensures that only certain users from specific ports and specific IP addresses have access to the systems that themselves access the KDS Translation Server 44.

Further, it is considered desirable that the KDS Translation Server 44 be logically isolated by other application software. This further ensures that only certain users from specific ports and specific IP addresses have access to the systems that themselves are able to access the KDS Translation Server 44.

Additionally, it is desirable that a comprehensive system of logging such as the file 42 be used to ensure that all access to the system 44 can be reviewed by an independent party, such as the Trusted Third Party 24 or the security department of the lottery administration 22 or a security department of the vendor 20 before the game is set for sale. The logs 42 can preferably be protected by a method known as "Hash Chaining" which prevents any tampering with or additions to or subtractions from the log 42.

In one aspect of the preferred embodiment of the invention, the KDS Translation Server 44 uses a KDS private key, a KDS shuffle algorithm, and a set of encrypted KDS seeds to shuffle and unshuffle packs between the P1 and the P2 domains. Each item has a role in this embodiment and is preferably present within the KDS Translation Server 44 in order translate between the two domains.

The KDS private key is preferably generated by the Trusted Third Party and is loaded on the KDS Translation Server. An associated KDS public key is delivered to the lottery administration 22 by the Trusted Third Party 24. The KDS shuffle seeds are then generated by the lottery security administration as needed for each game, encrypted with the public key and electronically delivered to the instant ticket vendor 20, specifically to the KDS Translation Server 44.

Another significant feature of the invention relates to the activation and deactivation of the KDS shuffle seeds. In the preferred embodiment, for example, during the ticket manufacturing process, the encrypted KDS shuffle seeds can be logically activated on the KDS Translation Server 44 and then decrypted. Here, the KDS shuffle algorithm, using the KDS shuffle seed for that game, translates the game's pack identifiers to and from the P1 and P2 domains as shown in FIG. 2. Once the instant ticket game is shipped to the customer, the KDS Shuffle seeds are deactivated and deleted. Deactivation ensures that the KDS shuffle seeds are logically revoked and cannot be used by the KDS Translation Server 44 even if they remain on the system. It should be noted that this activation and deactivation process can be used in other embodiments of the invention where for example a portion or all of the shuffle process can be activated and deactivated.

It should also be noted that once the KDS shuffle seeds are deactivated and also deleted, the instant ticket vendor 22 will generally not be able to translate packs between the domains. As a result, the instant ticket vendor 22 will not have a means to process meaningful pack value information based on the pack identifier.

A further feature of the invention is the provision that all KDS Translation Server 44 activity for each instant ticket game is logged to a secure log server. In practice, this can help ensure that there is a clear record of all shuffle/unshuffle activity. For example, a simplified log file stored in file 42 for example for a typical game can contain the following records: KDS shuffle seeds distributed and activated.

KDS shuffle seed decrypted using KDS Private Key.

KDS Translation Server shuffled P1 packs into P2 domain.

KDS Translation Server unshuffled P2 packs in to a shipfile

KDS Translation Server shuffled P1 packs in to a validation file.

KDS shuffle seeds deleted and deactivated.

In the preferred embodiment of the invention, the software for the KDS Translation Server 44 will force all transactions to be logged. During the KDS Certification process, the Trusted Third Party 24 will verify that the software will, in fact, securely log all transactions. Furthermore, the Trusted Third Party 24 will review each KDS Translation Server log 42 for each game and to identify any breach of security before the game is set for sale.

In the invention as described above, the purpose of the KDS Shuffle algorithm is to shuffle game generation (P1) packs into distribution (P2) packs and vice versa in a secure and consistent manner. The KDS shuffle algorithm uses the decrypted KDS shuffle seeds to govern the distribution of the shuffle such that if KDS Shuffle seed x and unshuffled-pack-set y are input, then the resulting shuffle set is consistently shuffled-pack-set z. Conversely, if KDS shuffle seed x and shuffled-pack-set z are input, the results are consistently unshuffled-pack-set y.

In other words, the KDS shuffle algorithm used in conjunction with the KDS shuffle seeds can consistently translate from the P1 domain into the P2 domain and vice versa.

The ability to securely and consistently shuffle and unshuffle the pack identifier allows the instant ticket vendor to manufacture tickets in an environment that permits the completion of certain agreed-upon single-pass-security services; and at the same time, it allow the instant ticket vendor to deliver instant tickets to the Lottery administration that exhibit the security restrictions of dual security. Furthermore, the independent role of the Trusted Third Party during the manufacturing process limits the instant ticket vendor's single-pass freedom; and the role of the Trusted Third Party during the life of the game enhances the dual-security restrictions.

Figure 4A:
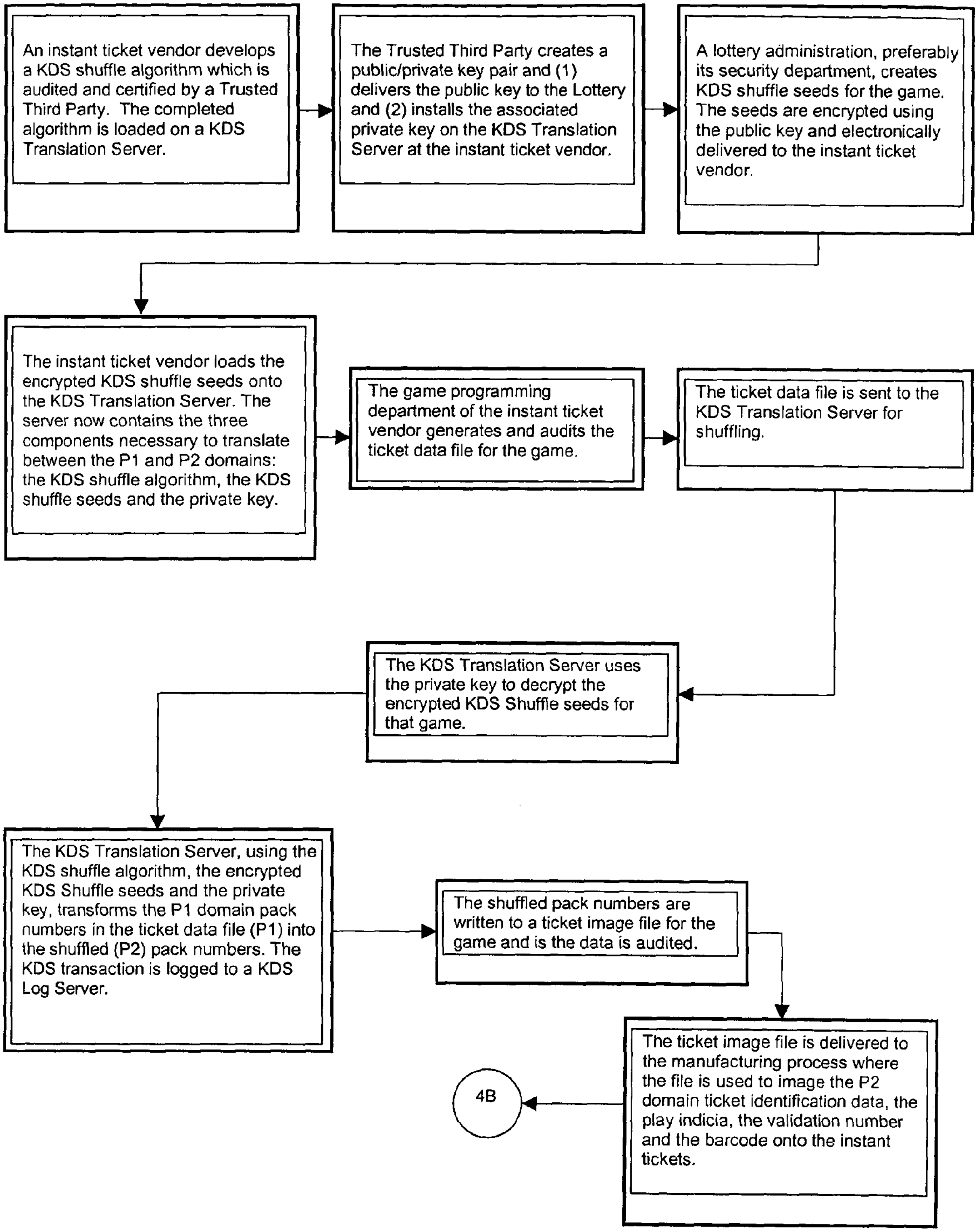
FIGS. 4A and 4B provide a logic flow diagram of a method of manufacturing lottery tickets according to the invention.
Figure 4B:
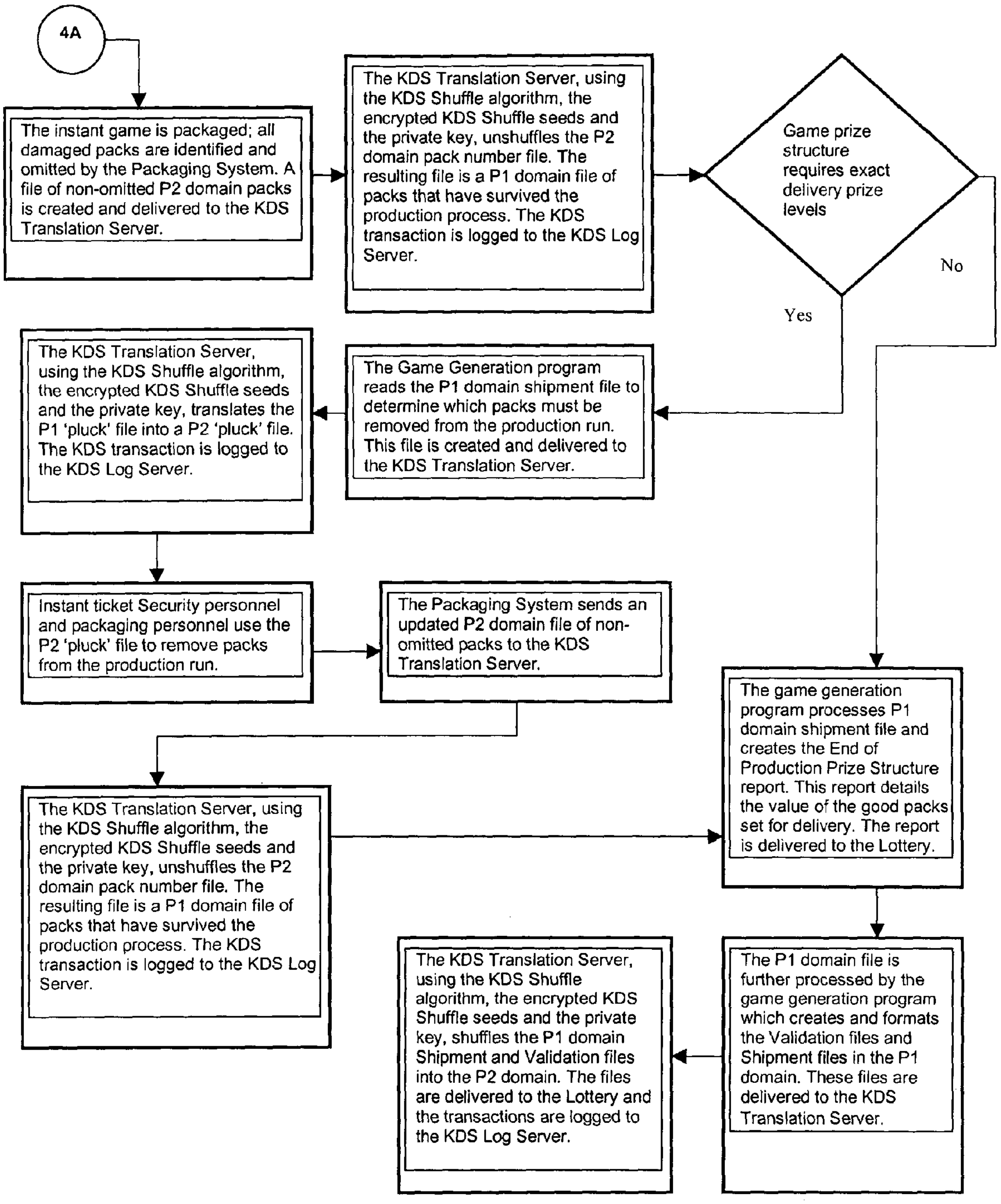

The process flow charts of FIGS. 4A and 4B provide a detailed description of the preferred method of operating the invention as described above.

It should be noted that the invention has been described in terms of the preferred embodiment and it is not intended to limit the invention to any particular type of lottery ticket, encryption system, hardware configuration or communication system in addition to the general lottery ticket manufacturing process described. Other implementations of the concepts described above are possible. For example, this secure manufacturing method could be used with other types of lottery tickets such as pull tab tickets or even some types of electronically transmitted tickets. Also, various types of encryption/decryption techniques can be used in addition to the public key technique described. Implementation in various types of hardware and hardware configurations besides the KDS Translation Server 44 is possible as well such as a system of distributed special purpose computers.

I claim:

1. A method for producing a predetermined number of instant lottery tickets comprising the steps of:

creating a first file having a record for each of the tickets wherein each of the records includes a ticket identifier and a value data representing the redemption value of the ticket wherein said ticket identifiers and said value data form a unique combination for each of the predetermined number of tickets;

creating a second file having a plurality of records corresponding to said records in said first file wherein at least a portion of said ticket identifiers are changed into modified ticket identifiers according to a shuffle process;

generating a link element associated with said shuffle process wherein said link element permits said modified first identifiers to be converted back into said ticket identifiers;

storing said link element in a secure environment such that said link element is only accessible under predetermine criteria; and printing the tickets utilizing said second file such that said modified ticket identifiers and said value data from said second file are printed on each of the tickets.

2. The method of claim 1 wherein said shuffle process utilizes a shuffle algorithm.

3. The method of claim 2 wherein said shuffle process utilizes at least one seed and said generating said link element includes placing said seed in an encrypted form.

4. The method of claim 2 wherein said link element includes at least a portion of said shuffle algorithm.

5. The method of claim 1 said printing is performed by a ticket vendor and said secure environment is a computer not accessible by said vendor.

6. The method of claim 1 wherein said step of creating said second file additionally includes transmitting said second file to a lottery administration computer.

7. The method of claim 6 wherein said steps of generating storing said link element include transmitting said link element for storage in a secure portion of said lottery administration computer.

8. The method of claim 1 additionally including the step of utilizing said link element and said second file to recreate at least a portion of said first file including said ticket identifiers for the tickets as printed.

9. The method of claim 8 wherein said step of creating said second file additionally includes transmitting said second file to a lottery administration computer, said steps of generating storing said link element include transmitting said link element for storage in said secure environment located in a secure portion of said lottery administration computer, and wherein said step of recreating said first file occurs in said lottery administration computer.

10. The method of claim 8 wherein a least a portion of said link element includes encrypted data.

11. The method of claim 10 wherein said shuffle process includes a shuffle algorithm having at least one seed and said encrypted data includes said seeds.

12. The method of claim 11 wherein said step of creating said second file additionally includes transmitting said second file to a first location, said steps of generating and storing said link element include transmitting said encrypted data to said secure environment located in a secure portion of said first location, and wherein said step of recreating said first file occurs in said first location and utilizes at least one decryption key for said encrypted data.

13. The method of claim 12 wherein said decryption key is maintained in a second location and transmitted to said first location from a second location in response to a set of predetermined criteria.

14. The method of claim 13 wherein said first location is a lottery administration computer and said second location is an independent party computer.

15. The method of claim 14 wherein said independent party creates said shuffle process and said decryption key and transmits said shuffle process to a ticket vendor who performs said steps of creating said second file and said printing of the tickets.

16. The method of claim 15 wherein said decryption key is maintained by said independent party in a secure server.

17. The method of claim 15 wherein said decryption key is transmitted according to said predetermined criteria by said independent party to said lottery administration computer for said recreation of said first file.

18. The method of claim 1 wherein said ticket identifiers include pack numbers and a ticket number.

19. The method of claim 18 wherein said shuffle process shuffles said pack numbers to create said modified ticket.

20. The method of claim 19 wherein said second file includes said value data and said is printed on the tickets in the form of validation data along with said modified ticket identifiers.

21. The method of claim 19 wherein said records in said first file additionally include a validation number including said value data and a set of play data for each of the tickets.

22. The method of claim 1 wherein the predetermined number of tickets corresponds to a pool of tickets in a game.

* * * * *